Patented Feb. 16, 1954

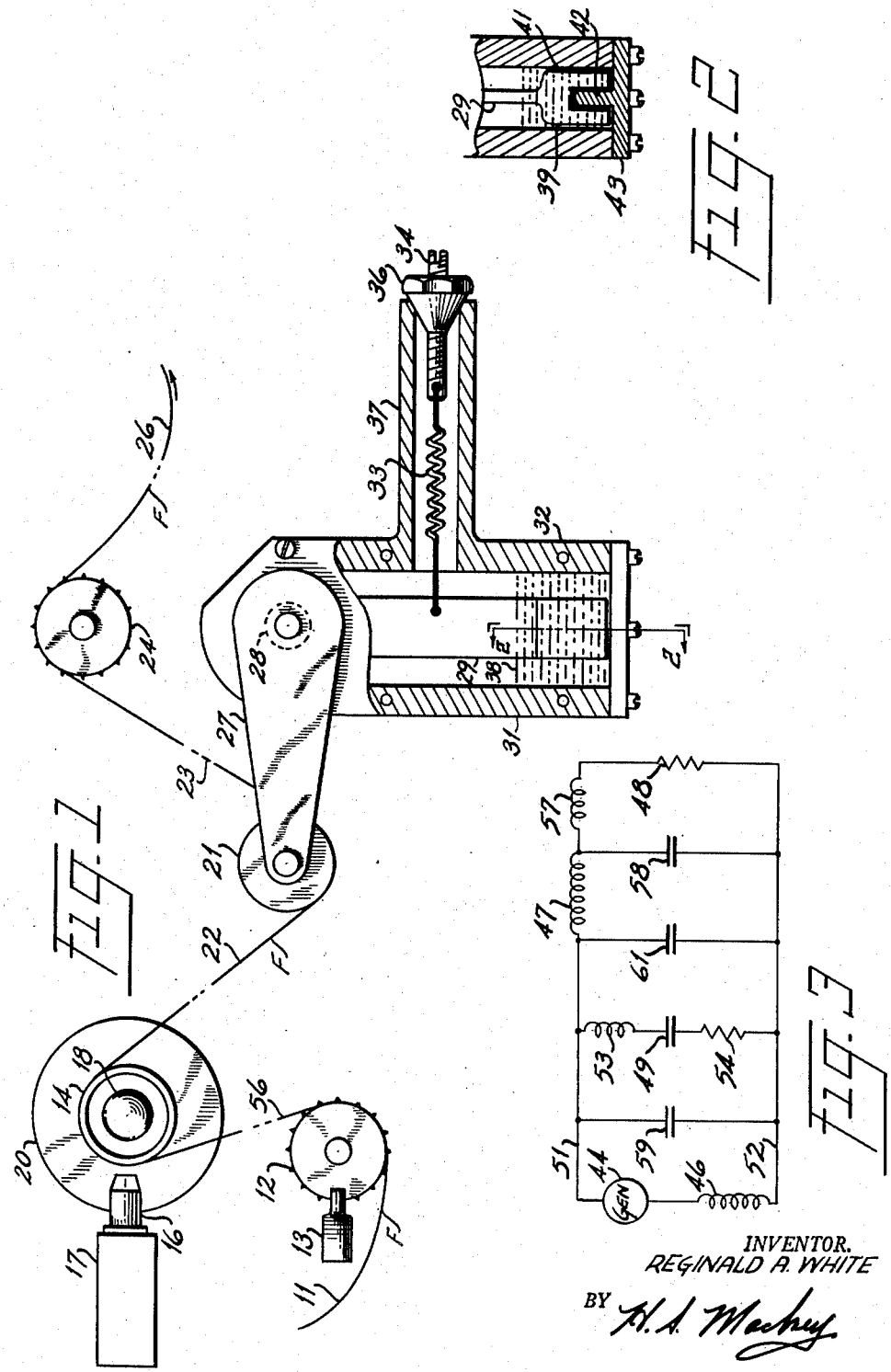

2,669,452

UNITED STATES PATENT OFFICE 2,669,452

SOUND STABILIZATION SYSTEM

Reginald A. White, Deepwood, Chappaqua, N. Y., assignor to General Precision Laboratory, Incorporated, a corporation of New York Application December 29, 1951, Serial No. 264,079

6 Claims. (Cl. 271—2.3)

This invention relates to a sound stabilization system for motion picture sound-on-film projectors and cameras wherein the velocity of the film as it passes past the scanning point is maintained constant.

In the usual mechanism for reproducing motion pictures and their accompanying sound from a single film strip the film is intermittently moved at the projection gate and at the same time is continuously moved at the nearby sound head so that the recorded sound may be properly reproduced.

In a similar manner, when sound is photographically or magnetically recorded on a film strip, the strip must have a constant speed as it passes the recording point.

Any irregularity in the speed of the film in a camera, projector, or recorder as it passes by the sound scanning or recording point, results in a fluctuation in the frequency of the sound recorded or reproduced, causing frequency modulation generally known as flutter. In such reproducing and recording mechanisms as they are usually constituted, various factors unite to produce irregularities in the velocity of the film as it passes the all-important scanning or recording point, and if satisfactory reproduction is to be had these irregularities must be filtered out so that at the scanning or recording point they are at least so reduced as not to be noticeable to the hearer.

Aside from the 24 cycles per second frequency modulation caused by the picture gate intermittent motion in cameras or projectors which clearly must be eliminated at the sound scanning or recording point, there are other factors such as sprocket hole disturbance, which has a frequency of 24 cps. in 16 mm. machines, 120 cps. noise mechanically transmitted from the driving motor, gear tooth noise, and fluctuations due to sprocket wheel or gear eccentricities. In the present state of the art, however, all of these types of disturbances have been quite satisfactorily eliminated by the use of various types of mechanical filters comprising inertial masses.

In the elimination of these sources of disturbances, however, it has been found that the short lengths of film under tension between the several rollers and sprocket wheels in the sound head act during operation as strong springs, and that these lengths of film, possibly together with springs introduced for special reasons, combine with inertial masses to form one or more mechanical oscillatory systems, which give rise during operation to periodic variations in film velocity at the scanning drum at the frequency of the oscillatory system. These periodic oscillations, being generated in the very components designed to filter disturbances out of the sound, are difficult to remove.

The present invention, however, provides an arrangement of components introducing compliance, mass and viscous friction, so that these components serve as a low-pass mechanical filter of one stage, thus preserving the filtering action of present devices and in addition eliminating the resonant type of flutter at its source.

It is obvious that more than one such low-pass filter stage may be connected in tandem, suitably coupled by rotating masses, to multiply the filtering effect.

A purpose of the present invention, therefore, is to provide an arrangement of mechanical filter elements so placed that at the scanning point the variations in film velocity are filtered out and no longer apparent even to the most discriminating.

Another purpose of the present invention is to provide a filter system including a damper which avoids the use of pressure rollers on the scanning drum and thus eliminates the frequency modulation caused by the unavoidable imperfections in such devices.

Still another purpose of the present invention is to provide as an element of the filter system a mechanical resistance or damper assembly affording a maximum of dependability and accessibility whereby the filter elements of the damper assembly may be readily adjusted and maintained in adjustment over long periods.

A feature of the invention resides in the provision of an idler roller connected to a silicone dashpot and tension spring, the assembly being so constructed that the characteristics of the spring and dash-pot filter element do not vary appreciably from their optimum values with displacement of the idler roller from its mean position.

The invention will be more readily understood from the following specification when read in connection with the accompanying drawings in which:

Fig. 1 diagrammatically illustrates a projector sound head including a filter damping unit.

Fig. 2 is a section taken on the line 2—2 of Fig. 1 of a portion of the filter damping unit.

Fig. 3 represents an electrical circuit having properties analogous to those of the sound head mechanical system.

Referring now to Fig. 1, the dashed line F represents the path of a sound film through the sound head of a reproducing apparatus. The film is introduced from the intermittent mechanism at 11 where the film forms a loop of fluctuating size in accordance with the motion of the intermittent mechanism.

The film F is next bent around a drag idle sprocket 12. The resistance which this sprocket 12 introduces may be of any type but it is far preferable to employ a type having substantially zero error, for example viscous friction or magnetic drag. The latter is preferred as an example and is indicated in Fig. 1 by a permanent magnet 13 placed to interact with the steel sprocket wheel 12 to cause eddy currents therein and electromechanical resistance to its rotation.

From the drag idle sprocket 12 the film is led to and around a scanning drum 14 which is so constructed that the sound record portion of the film overhangs the edge of the drum. The overhanging sound record portion of the film F is a part of a reproducing optical system comprising a condenser lens tube 16 which extends into a lamp compartment 17 to receive light from an exciter lamp therein.

The collimated light in the form of a very thin flat ribbon is passed through the sound record on the edge of the film to fall on a phototube 18.

A relatively heavy flywheel 20 is secured by means of a shaft to the scanning drum 14, so that as the film drives the scanning drum 14 it rotates the flywheel 20. It is necessary for the rotational speed of the scanning drum to have the greatest possible constancy and this requirement is partly met by the tendency of the flywheel, by reason of its rotational inertia, to resist speed changes. If, however, the film were drawn directly from the scanning drum by a sound pulling sprocket, any variations in speed of the latter, while being resisted by the flywheel inertia, would still have appreciable effect upon the flywheel speed.

There is therefore interposed between the flywheel and scanning drum 14 and the sound pulling sprocket a spring-loaded idler 21 resting in a taut loop of film, one branch 22 of the loop progressing from the sound scanning drum 14 to the spring-loaded idler 21 and the other branch 23 running from the idler 21 and drawn by a sound pulling sprocket 24. The film after leaving the sound pulling sprocket 24 forms a loop 26 leading to a conventional pulling sprocket and take-up reel (not shown). Alternatively if desired the loop 26 may be omitted and the film run directly from the sprocket 24 to the take-up reel. The sprocket 24 is positively and smoothly driven by a motor at the appropriate speed to secure the conventional film speed of 24 frames per second. Minor variations in speed of the driving motor, especially variations during any single motor revolution, are compensated for by movements of the idler 21, its spring tension being such as to tend to maintain constant tension in the film branches 22 and 23.

The use of the spring-loaded idler 21, while thoroughly isolating the scanning drum from motor speed changes and other interferences originating at the sound pulling sprocket 24 as just described, may cause undesirable periodic oscillations of the sound scanning drum through the building up of energy in the mechanically resonant system consisting of the flywheel 20 and the resilient means employed to load the idler 21. The resilient means is coupled to the flywheel through the idler by means of the resilience of the film branch 22, which in this condition acts as a stiff spring. These resonant oscillations might be damped out in some cases by making the damping effect of the drag idler 12 large enough, were such increase not prohibited by the destructive effect of the resulting stress on the film. It is therefore necessary to introduce damping at a point where it does not apply drag to the film and this is done by applying damping to translational motion of the idle roller 21.

The idler 21 is carried on the end of a crank arm 27 journalled preferably in antifriction bearings. A paddle arm 29 is secured to the crank arm 27 and depends from the same bearings so that the paddle arm 29 hangs preferably vertically in a chamber enclosed by walls 31 and 32. In any case the arm 29 should not depart more than 45° from the vertically suspended position in order to minimize leakage of fluid from the crank arm bearings and thus to permit simplification of their design. A tension spring 33 urges the paddle arm 29 toward the right in the figure, and is adjustable in tension by means of a screw 34 and nut 36. The spring is enclosed in a barrel 37. Silicone liquid 38 fills the lower part of the paddle chamber.

Fig. 2 shows a broken cross section of the chamber on the line 2—2. The paddle arm 29 is constructed to have only small clearance at its sides 39 and 41, thus increasing the damping effect when the paddle moves. A clearance of $\frac{1}{32}$ inch has been found suitable. To increase the active surface of the paddle a partition 42 is provided on the floor plate 43, and a corresponding slot is provided in the paddle 29, the clearances here also being $\frac{1}{32}$ inch. Since the operation of the damper depends principally on internal fluid friction in the silicone liquid and partly on intersurface friction where the silicone liquid touches the paddle, the damping effect is directly proportional to the active surface area of the paddle. As the paddle clearances are reduced, the intersurface friction plays an increasing part, therefore in the interest of the efficient use of material and reduction of size of components the clearances are made small.

When the mechanical system is considered consisting of the film F and the several rollers and sprocket wheels over which it travels in the sound head, there are three components which obviously form a system capable of oscillation. This system includes the flywheel 20, the spring 33 and the drag idler 12, in which the flywheel 20 by virtue of its rotational mass supplies the inertia, the spring through the reciprocal of its stiffness measured as spring constant supplies compliance, and the idler because of its drag supplies mechanical resistance.

In order that the interrelations of the filter system may be more easily visualized, the electrical analogy thereof is schematically illustrated in Fig. 3. The introduction of energy at the pulling sprocket 24 is indicated in Fig. 3 as a generator 44, resulting in a nominally constant velocity of film analogous to electrical direct current. Aberrations in the constancy of film velocity are analogous to alternating or fluctuating electrical current. These aberrant velocities are minimized by the rotational masses of the pulling sprocket and of the motor system driving it. Their considerable rotational moments of inertia are represented as a large inductance 46. The resulting mechanical torque is applied to the flywheel 20 and also to the drag sprocket 12, which are represented respectively by the large inductance 47 and the resistance 48. The spring 33 is represented by a large capacitance 49 placed in parallel with the supply mains 51 and 52, because the torque thereon, analogous to voltage, does not go through the spring 33 in its application to the flywheel and drag, and in fact if constant has no effect upon the spring.

The inductance 53 represents the moment of inertia introduced by the roller 21 and arm 27 and although it can be made negligibly small in comparison with the sizes of the other components, it is added for completeness.

The condenser 49, inductance 47 and resistor 48 form a closed damped oscillatory system. However, their magnitudes are such that critical damping cannot be attained by values of the drag resistance 48 that can safely be used.

In order to introduce critical damping the damper 29 is added. This is represented in Fig. 3 by the resistance 54. It is in series with the condenser 49 and is in the shunt arm across the mains 51 and 52, and therefore does not add to the film drag. However, it is in series in the oscillatory system comprising the condenser 49 and the flywheel inductance 47, so that it contributes directly to the damping thereof. Because of this friction, the magnitude of the drag resistor 48 can be reduced to merely that necessary to maintain tension on the film branches 56 and 22 and to serve in a secondary filter circuit for the complete isolation of the scanning drum from the 24 cps. oscillations of the free loop 11 in the following manner.

The rotational inertia of the drag sprocket 12 is represented in Fig. 3 by the small inductance 57, and the compliance of the film itself in its branch 56 is represented by the small capacitance 58. These components together with the resistance 48 of the drag sprocket constitute a damped oscillatory circuit and the dimensions are such that when a slight amount of 24 cps. energy is applied to the drag sprocket 12 by the film loop 11, the combination acts as an effective filter, preventing any of this energy from reaching the flywheel mass represented by inductance 47.

The small capacitances 59 and 61 represent the compliances of the film branches 23 and 22 respectively, and are included for completeness.

In operation of this sound head, impulses of energy tending to cause oscillation in the system including the flywheel 20 and the spring 33 are immediately damped out, even though very small, because the damper 29 damps by viscous friction and therefore offers no static resistance. It is in order to insure this condition that the bearings 28 are of the antifriction type. It is preferable to damp this system by about 80% of the critical amount, the condition for critical damping being that $$r_m^2 = \frac{4I}{C_m}$$

in which $r_m$ is the mechanical resistance of the system, $I$ is principally the moment of inertia of the flywheel 20, and $C_m$ is principally the mechanical compliance of the spring 33.

What is claimed is:

1. The combination in a film propelling apparatus having a film driven sound drum and a sprocket means for driving a film strip, of a mechanical filter means engaging said film between said drum and said sprocket means, said mechanical filter means comprising an arm, a film engaging roller mounted thereon, a member connected to said arm and constrained for rotational movement therewith, said member having a portion thereof extending into a chamber partially filled with viscous fluid and immersed therein, said chamber being provided with a rib extending inwardly of said chamber from the base thereof, the portion of said member immersed in said fluid being provided with a groove cooperating with said rib, the side surfaces of said rib being in close proximity to the interior surfaces of said groove to provide a high intersurface friction therebetween through the medium of said viscous fluid, and resilient means for maintaining said roller in engagement with said film.

2. The combination in a film propelling apparatus having a film driven sound drum and a sprocket means for driving a film strip, of a mechanical filter means engaging said film between said drum and said sprocket means, said mechanical filter means comprising an arm, a film engaging roller mounted thereon, a member connected to said arm and constrained for rotational movement therewith, said member having a portion thereof extending into a chamber partially filled with viscous fluid and immersed therein, said chamber being provided with a rib extending inwardly of said chamber from the base thereof, the portion of said member immersed in said fluid being provided with a groove cooperating with said rib, the interior surfaces of said groove being in close proximity to the exterior surfaces of said rib and the exterior surfaces of the portion immersed in said fluid being in close proximity to the interior surface of said chamber to provide high intersurface friction between said member and said chamber through the medium of said viscous fluid, and resilient means for maintaining said roller in engagement with said film.

3. The combination in a film propelling apparatus having a film driven sound drum and a sprocket means for driving a film strip, of a mechanical filter means engaging said film between said drum and said sprocket means, said mechanical filter means comprising a first pivoted arm, a film engaging roller mounted thereon, a second arm connected to said first arm and constrained for rotational movement therewith, a chamber partially filled with viscous fluid, a longitudinal rib extending inwardly of said chamber from the base thereof, said second arm having a paddle shape end portion depending into said chamber and immersed in said fluid, said end portion being provided with a pair of arms lying on either side of said rib with their inner surfaces in close proximity to the sides of said rib, and resilient means attached to one of said arms for maintaining said roller in engagement with said film.

4. The combination in a film propelling apparatus having a film driven sound drum and a sprocket means for a film strip, of a mechanical filter means engaging said film between said drum and said sprocket means, said mechanical filter means comprising a first pivoted arm, a film engaging roller mounted thereon, a second arm connected to said first arm and constrained for rotational movement therewith, a rectangular chamber partially filled with viscous fluid, a longitudinal rib extending inwardly of said chamber from the base thereof, said second arm having a U-shaped end portion depending into said chamber with the legs thereof lying on either side of said rib the inner faces thereof being in close proximity to the side faces of said rib and the outer faces of said legs being in close proximity to the inner longitudinal surfaces of said chamber, and resilient means attached to one of said arms for maintaining said roller in engagement with said film.

5. A sound film propelling apparatus for imparting uniform velocity to a film strip as it passes a scanning point comprising, a driving sprocket located posteriorly of said scanning point engaging said film strip, a sound drum located at said scanning point engaged by said film strip and frictionally driven thereby, a drag sprocket located in advance of said scanning point engaged by said film strip, an arm pivoted at one end and having a roller affixed to its other end in engagement with said film strip at a point intermediate said sound drum and said driving sprocket, a member connected to said arm and constrained for rotational movement therewith, a chamber partially filled with viscous fluid, said chamber being provided with a rib extending inwardly of said chamber from the base thereof, said member having an end portion extending into said chamber and immersed in said fluid, said end portion being provided with a groove mating with said rib, the surfaces of said groove being in close proximity to sides of said rib to provide high intersurface friction therebetween through the medium of said viscous fluid, and resilient means for maintaining said roller in engagement with said film strip.

6. A sound film propelling apparatus for imparting uniform velocity to a film strip as it passes a scanning point comprising, a driving sprocket located posteriorly of said scanning point engaging said film strip, a sound drum located at said scanning point engaged by said film strip and frictionally driven thereby, a drag sprocket located in advance of said scanning point engaged by said film strip, an arm pivoted at one end and having a roller affixed to its other end in engagement with said film strip at a point intermediate said sound drum and said driving sprocket, a member connected to said arm and constrained for rotational movement therewith, a chamber partially filled with viscous fluid, said chamber being provided with a rib extending inwardly of said chamber from the base thereof, said member having an end portion extending into said chamber and immersed in said fluid, said end portion being provided with a groove mating with said rib, the surfaces of said groove being in close proximity to the sides of said rib and an outer surface of said end portion being in close proximity to an inner surface of said chamber to provide high intersurface friction between said surfaces through the medium of said viscous fluid, and resilient means for maintaining said roller in engagement with said film strip.

REGINALD A. WHITE.

References Cited in the file of this patent

UNITED STATES PATENTS

| Number | Name | Date |
| --- | --- | --- |
| 1,333,040 | Schwantes | Mar. 9, 1920 |
| 1,873,100 | Allen | Aug. 23, 1932 |
| 1,892,554 | Kellogg | Dec. 27, 1932 |
| 2,082,456 | Liedtke et al. | June 1, 1937 |